US009213421B2

(12) United States Patent
Langlois et al.

(10) Patent No.: US 9,213,421 B2
(45) Date of Patent: Dec. 15, 2015

(54) ELECTRONIC DEVICE AND METHOD OF DISPLAYING INFORMATION IN RESPONSE TO DETECTING A GESTURE

(71) Applicants: Michael George Langlois, Ottawa (CA); Nils Roger Andersson Reimer, Malmö (SE); Donald James Lindsay, Mountainview, CA (US)

(72) Inventors: Michael George Langlois, Ottawa (CA); Nils Roger Andersson Reimer, Malmö (SE); Donald James Lindsay, Mountainview, CA (US)

(73) Assignee: BlackBerry Limited, Waterloo (CA)

(*) Notice: Subject to any disclaimer, the term of this patent is extended or adjusted under 35 U.S.C. 154(b) by 275 days.

(21) Appl. No.: 13/660,343

(22) Filed: Oct. 25, 2012

(65) Prior Publication Data

US 2013/0055170 A1  Feb. 28, 2013

Related U.S. Application Data

(63) Continuation-in-part of application No. 13/036,186, filed on Feb. 28, 2011.

(51) Int. Cl.
| G06F 3/00 | (2006.01) |
| G06F 3/0338 | (2013.01) |
| G06F 1/16 | (2006.01) |
| G06F 3/01 | (2006.01) |
| G06F 3/02 | (2006.01) |
| G06F 3/041 | (2006.01) |

(Continued)

(52) U.S. Cl.
CPC ............ *G06F 3/0338* (2013.01); *G06F 1/1626* (2013.01); *G06F 3/016* (2013.01); *G06F 3/0202* (2013.01); *G06F 3/0414* (2013.01); *G06F 3/04883* (2013.01); *H04M 1/72547* (2013.01)

(58) Field of Classification Search
CPC .... G06F 3/04883; G06F 3/017; G06F 3/0481
USPC ........................................................ 715/863
See application file for complete search history.

(56) References Cited

U.S. PATENT DOCUMENTS

| 5,570,109 A | 10/1996 | Jenson |
| 5,651,107 A | 7/1997 | Frank et al. |
| 6,073,109 A | 6/2000 | Flores et al. |

(Continued)

FOREIGN PATENT DOCUMENTS

| EP | 2015176 A1 | 1/2009 |
| EP | 2045700 A1 | 4/2009 |

(Continued)

OTHER PUBLICATIONS

"User Guide" Samsung Epic 4G, A Galaxy S Phone, Sprint Oct. 8, 2010, pp. 268.

(Continued)

*Primary Examiner* — Haoshian Shih
(74) *Attorney, Agent, or Firm* — Steven M. Greenberg, Esq.; Gary Moka, Esq.; CRGO Law

(57) ABSTRACT

A gesture is detected by an electronic device including a display. In response to detecting a first part of the gesture, a first part of first information is displayed on the display. In response to detecting a second part of the gesture subsequent to the first part of the gesture, the display of the first part of the first information is maintained. In response to detecting a third part of the gesture subsequent to the second part of the gesture, an additional part of the information is displayed.

6 Claims, 10 Drawing Sheets

(51) Int. Cl.
  *G06F 3/0488*  (2013.01)
  *H04M 1/725*  (2006.01)

(56) References Cited

U.S. PATENT DOCUMENTS

| | | |
|---|---|---|
| 6,333,973 B1 | 12/2001 | Smith |
| 6,584,181 B1 | 6/2003 | Aktas |
| 7,283,808 B2 | 10/2007 | Castell et al. |
| 7,308,653 B2 | 12/2007 | Lin-Hendel |
| 7,370,284 B2 | 5/2008 | Andrea et al. |
| 7,385,875 B2 | 6/2008 | May et al. |
| 7,430,409 B2 | 9/2008 | Klassen |
| 7,484,213 B2 | 1/2009 | Mathew et al. |
| 7,539,945 B2 | 5/2009 | Conrad |
| 7,752,279 B2 | 7/2010 | Hardy et al. |
| 7,802,206 B1 | 9/2010 | Davis et al. |
| 7,844,915 B2 | 11/2010 | Platzer et al. |
| 7,904,828 B2 | 3/2011 | Conrad |
| 7,996,045 B1 | 8/2011 | Bauer et al. |
| 8,032,482 B2 | 10/2011 | Rosenberg |
| 8,082,518 B2 | 12/2011 | Flake et al. |
| 8,099,681 B2 | 1/2012 | Flanagan et al. |
| 8,134,727 B1 | 3/2012 | Shmunis et al. |
| 8,140,975 B2 | 3/2012 | Lemay et al. |
| 8,237,664 B2 | 8/2012 | Swanbufg et al. |
| 8,239,785 B2 | 8/2012 | Hinckley et al. |
| 8,249,664 B1 | 8/2012 | Bauer |
| 8,271,660 B2 | 9/2012 | Schulzrinne et al. |
| 8,271,907 B2 | 9/2012 | Kim et al. |
| 8,280,962 B2 | 10/2012 | Muniz et al. |
| 8,291,344 B2 | 10/2012 | Chaudhari |
| 8,359,017 B2 | 1/2013 | Bruchelt |
| 8,392,837 B2 | 3/2013 | Li |
| 8,402,384 B2 | 3/2013 | Scott |
| 8,453,047 B2 | 5/2013 | Holm et al. |
| 8,473,843 B2 | 6/2013 | Lundy et al. |
| 8,479,122 B2 | 7/2013 | Hotelling et al. |
| 2002/0098831 A1 | 7/2002 | Castell et al. |
| 2002/0126155 A1 | 9/2002 | Lin-Hendel |
| 2003/0070000 A1 | 4/2003 | Coker et al. |
| 2004/0068545 A1 | 4/2004 | Daniell et al. |
| 2004/0117451 A1 | 6/2004 | Chung |
| 2004/0128353 A1 | 7/2004 | Goodman et al. |
| 2004/0196259 A1 | 10/2004 | Bradski |
| 2004/0243677 A1 | 12/2004 | Curbow et al. |
| 2005/0108655 A1 | 5/2005 | Andrea et al. |
| 2006/0026521 A1 | 2/2006 | Hotelling et al. |
| 2006/0075046 A1 | 4/2006 | Yozell-Epstein et al. |
| 2006/0123360 A1 | 6/2006 | Anwar et al. |
| 2006/0156240 A1 | 7/2006 | Lemay et al. |
| 2006/0190833 A1 | 8/2006 | SanGiovanni et al. |
| 2006/0250377 A1 | 11/2006 | Zadesky et al. |
| 2006/0270461 A1 | 11/2006 | Won et al. |
| 2006/0284852 A1 | 12/2006 | Hofmeister et al. |
| 2007/0011258 A1 | 1/2007 | Khoo |
| 2007/0016958 A1 | 1/2007 | Bodepudi et al. |
| 2007/0083600 A1 | 4/2007 | Bakos et al. |
| 2007/0106939 A1 | 5/2007 | Qassoudi |
| 2007/0139372 A1 | 6/2007 | Swanburg et al. |
| 2007/0152977 A1 | 7/2007 | Ng et al. |
| 2007/0220444 A1 | 9/2007 | Sunday et al. |
| 2007/0236468 A1 | 10/2007 | Tuli |
| 2007/0256035 A1 | 11/2007 | Matsuzawa et al. |
| 2008/0005247 A9 | 1/2008 | Khoo |
| 2008/0008163 A1 | 1/2008 | Castell et al. |
| 2008/0034047 A1 | 2/2008 | Rosenberg et al. |
| 2008/0046824 A1 | 2/2008 | Li et al. |
| 2008/0094369 A1 | 4/2008 | Ganatra et al. |
| 2008/0165151 A1 | 7/2008 | Lemay et al. |
| 2008/0165160 A1 | 7/2008 | Kocienda |
| 2008/0174570 A1 | 7/2008 | Jobs et al. |
| 2008/0189622 A1 | 8/2008 | Sanchez et al. |
| 2008/0261569 A1 | 10/2008 | Britt et al. |
| 2008/0272927 A1 | 11/2008 | Woolley et al. |
| 2008/0273014 A1 | 11/2008 | Lowles et al. |
| 2009/0006991 A1 | 1/2009 | Lindberg et al. |
| 2009/0013282 A1 | 1/2009 | Mercer |
| 2009/0064055 A1 | 3/2009 | Chaudhri et al. |
| 2009/0094562 A1 | 4/2009 | Jeong et al. |
| 2009/0144661 A1 | 6/2009 | Nakajima et al. |
| 2009/0174679 A1 | 7/2009 | Westerman |
| 2009/0177754 A1* | 7/2009 | Brezina et al. ................ 709/206 |
| 2009/0195518 A1 | 8/2009 | Mattice et al. |
| 2009/0199130 A1 | 8/2009 | Tsern et al. |
| 2009/0237367 A1 | 9/2009 | Ryu et al. |
| 2009/0249247 A1 | 10/2009 | Tseng et al. |
| 2009/0252312 A1 | 10/2009 | Muniz et al. |
| 2009/0267909 A1 | 10/2009 | Chen et al. |
| 2009/0273583 A1 | 11/2009 | Norhammar |
| 2009/0278806 A1 | 11/2009 | Duarte et al. |
| 2009/0292690 A1 | 11/2009 | Culbert |
| 2009/0295753 A1 | 12/2009 | King et al. |
| 2009/0307631 A1 | 12/2009 | Kim et al. |
| 2010/0011304 A1 | 1/2010 | Van Os |
| 2010/0013782 A1 | 1/2010 | Liu et al. |
| 2010/0017695 A1 | 1/2010 | Palmieri |
| 2010/0042954 A1 | 2/2010 | Rosenblatt et al. |
| 2010/0058226 A1 | 3/2010 | Flake et al. |
| 2010/0060586 A1 | 3/2010 | Pisula et al. |
| 2010/0066698 A1 | 3/2010 | Seo |
| 2010/0079392 A1 | 4/2010 | Chiang et al. |
| 2010/0095224 A1 | 4/2010 | Yozell-Epstein et al. |
| 2010/0095239 A1 | 4/2010 | McCommons et al. |
| 2010/0107067 A1 | 4/2010 | Vaisanen et al. |
| 2010/0153951 A1 | 6/2010 | Jones |
| 2010/0156656 A1 | 6/2010 | Duarte et al. |
| 2010/0162180 A1* | 6/2010 | Dunnam et al. ............... 715/863 |
| 2010/0169722 A1 | 7/2010 | Wu et al. |
| 2010/0171753 A1 | 7/2010 | Kwon |
| 2010/0175018 A1 | 7/2010 | Petschnig et al. |
| 2010/0182248 A1 | 7/2010 | Chu |
| 2010/0185989 A1 | 7/2010 | Shiplacoff et al. |
| 2010/0214237 A1 | 8/2010 | Echeverri et al. |
| 2010/0218130 A1 | 8/2010 | Conrad et al. |
| 2010/0231533 A1 | 9/2010 | Chaudhri |
| 2010/0235794 A1* | 9/2010 | Ording ......................... 715/863 |
| 2010/0248689 A1 | 9/2010 | Teng et al. |
| 2010/0251178 A1 | 9/2010 | Lee et al. |
| 2010/0289760 A1 | 11/2010 | Jonoshita et al. |
| 2010/0295772 A1 | 11/2010 | Alameh et al. |
| 2010/0302172 A1 | 12/2010 | Wilairat |
| 2010/0306693 A1 | 12/2010 | Brinda |
| 2010/0306705 A1 | 12/2010 | Nilsson |
| 2011/0029927 A1 | 2/2011 | Lietzke et al. |
| 2011/0034208 A1 | 2/2011 | Gu et al. |
| 2011/0083111 A1 | 4/2011 | Forutanpour et al. |
| 2011/0099490 A1 | 4/2011 | Barraclough et al. |
| 2011/0163944 A1 | 7/2011 | Bilbrey et al. |
| 2011/0163970 A1 | 7/2011 | Lemay |
| 2011/0175839 A1 | 7/2011 | Prabhu |
| 2011/0185318 A1 | 7/2011 | Hinckley et al. |
| 2011/0209088 A1 | 8/2011 | Hinckley et al. |
| 2011/0209097 A1 | 8/2011 | Hinckley et al. |
| 2011/0209104 A1 | 8/2011 | Hinckley et al. |
| 2011/0210983 A1 | 9/2011 | Theimer et al. |
| 2011/0231499 A1 | 9/2011 | Stovicek et al. |
| 2011/0252369 A1 | 10/2011 | Chaudhri |
| 2011/0252381 A1 | 10/2011 | Chaudhri |
| 2011/0256848 A1 | 10/2011 | Bok et al. |
| 2011/0294467 A1 | 12/2011 | Kim et al. |
| 2012/0013552 A1 | 1/2012 | Ahn |
| 2012/0026194 A1 | 2/2012 | Wagner et al. |
| 2012/0032979 A1 | 2/2012 | Blow et al. |
| 2012/0084697 A1 | 4/2012 | Reeves |
| 2012/0084698 A1 | 4/2012 | Sirpal et al. |
| 2012/0090004 A1 | 4/2012 | Jeong |
| 2012/0115449 A1 | 5/2012 | Bruchelt |
| 2012/0159380 A1 | 6/2012 | Kocienda et al. |
| 2012/0192108 A1 | 7/2012 | Kolb |
| 2012/0206392 A1 | 8/2012 | Ng et al. |
| 2012/0210214 A1 | 8/2012 | Yoo et al. |
| 2012/0266082 A1 | 10/2012 | Webber |
| 2012/0284673 A1* | 11/2012 | Lamb et al. ................... 715/863 |
| 2012/0290946 A1 | 11/2012 | Schrock et al. |

(56) References Cited

U.S. PATENT DOCUMENTS

| | | | |
|---|---|---|---|
| 2012/0304108 A1 | 11/2012 | Jarrett | |
| 2012/0311444 A1 | 12/2012 | Chaudhri | |
| 2012/0326984 A1 | 12/2012 | Ghassabian | |
| 2013/0002524 A1 | 1/2013 | Sirpal et al. | |
| 2013/0033477 A1 | 2/2013 | Sirpal et al. | |
| 2013/0083260 A1 | 4/2013 | Minami | |
| 2013/0167066 A1 | 6/2013 | Scott | |
| 2013/0185650 A1 | 7/2013 | Gutowitz | |
| 2013/0321340 A1* | 12/2013 | Seo et al. | 345/174 |
| 2014/0068494 A1* | 3/2014 | Petersen et al. | 715/778 |

FOREIGN PATENT DOCUMENTS

| | | | |
|---|---|---|---|
| EP | 2068236 A1 | 6/2009 | |
| EP | 2109030 A2 | 10/2009 | |
| EP | 2383636 A1 | 11/2011 | |
| EP | 2458493 A3 | 5/2012 | |
| EP | 2485138 A1 | 8/2012 | |
| KR | 10-2008-0041809 A1 | 5/2008 | |
| KR | 10-2009-0036578 A | 4/2009 | |
| KR | 10-2010-0032660 A | 3/2010 | |
| WO | 2004051451 A3 | 6/2004 | |
| WO | 2009097555 A2 | 8/2009 | |
| WO | 2009120925 A2 | 10/2009 | |
| WO | 2010040670 A1 | 4/2010 | |
| WO | 2012097385 A2 | 7/2012 | |
| WO | 2012128795 A1 | 9/2012 | |

OTHER PUBLICATIONS http://www.evernote.com/peek/ Retrieved Aug. 27, 2012, 2 pages.

Levesque, et al., Frictional Widgets: Enhancing Touch Interfaces with Programmable Friction, published CHI 2011, ACM 978-1-4503-0268-5/11/05, May 7-12, 2011, 6 pages.

http://www.jimblackler.net/blog/?p=67/ "QuickCalendar, an application for Android written in Java" Retrieved Oct. 18, 2012, 6 pages.

Apple, iOS: Understanding Notifications, http://support.apple.com/kb/HT3576[Oct. 18, 2012 6:05:38 PM], last modified Sep. 19, 2012, 3 pages.

Google, Android 2.3 User's Guide, AUG-2.3-103 Android™ mobile technology platform 2.3, Dec. 13, 2010, 380 pages (English Language Version).

Google, Android 2.3 User's Guide, AUG-2.3-103-KO Android™ mobile technology platform 2.3, Dec. 13, 2010, 368 pages (Korean Language Version).

Microsoft, "Cross Sliding State enumeration", internet article, http://www.msdn.microsoft.com/en-us/library/windows/apps/windows.ui.input.crossslidingstate , Retrieved Sep. 4, 2012, 2 pages.

http://www.gigaom.com/2011/10/12/ios-5-notifications-and-notification-center/, Retrieved May 2, 2013, Asch, Josh, "iOS 5: Notifications and Notification Center", Tech News and Analysis, Oct. 12, 2011, four pages.

International Searching Authority, International Search Report and Written Opinion issued in related International Application No. PCT/US2013/020649, dated Apr. 29, 2013, 14 pages.

* cited by examiner

ELECTRONIC DEVICE AND METHOD OF DISPLAYING INFORMATION IN RESPONSE TO DETECTING A GESTURE

CROSS REFERENCE TO RELATED APPLICATION

This patent application is a continuation-in-part of and claims priority to U.S. patent application Ser. No. 13/036,186, filed on Feb. 28, 2011, titled "ELECTRONIC DEVICE AND METHOD OF DISPLAYING INFORMATION IN RESPONSE TO INPUT," the contents of which application is incorporated herein by reference in their entirety.

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
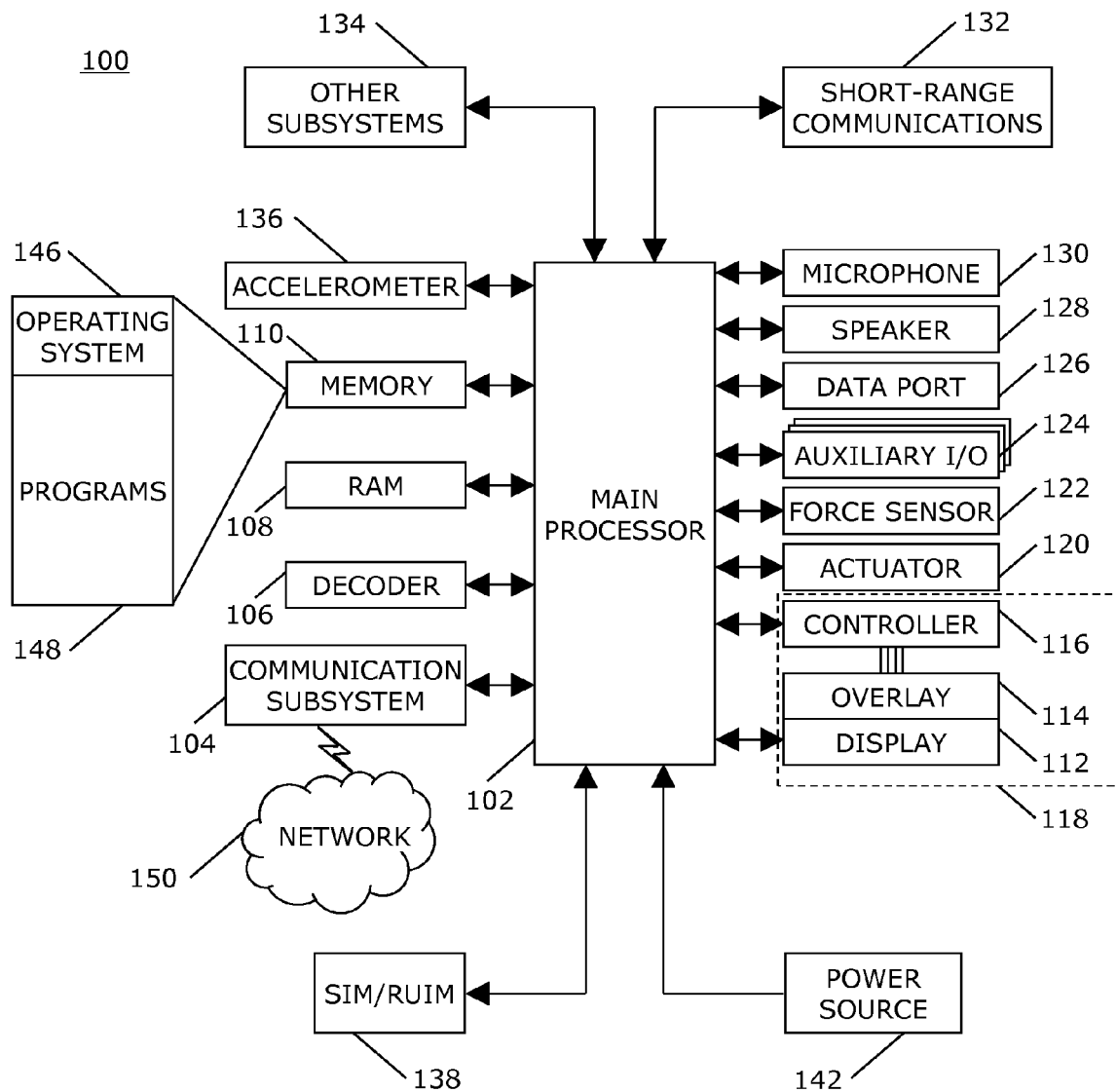
FIG. 1 is a block diagram of a portable electronic device in accordance with the disclosure.

The following describes an apparatus for and method of displaying information for a plurality of applications. While information for one application is displayed, a gesture is detected, and information for another application is displayed at an end of the original application. For example, while in an email application, when the gesture is detected, information associated with a calendar is displayed after the email application information is displayed. Thus, a user is provided with a quick way to open an additional application or preview information from the additional application without having to navigate to select an icon or enter a menu. The information may be displayed on any electronic device, including, for example, a portable electronic device.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smart-phones, wireless organizers, personal digital assistants, wirelessly enabled notebook computers, tablet computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable contact member, such as a finger, thumb, appendage, or other objects, for example, a stylus, pen, or other pointer, depending on the nature of the touch-sensitive display 118. Multiple simultaneous touches may be detected.

One or more actuators 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. The actuator may be any suitable actuator, including mechanical and/or electrical actuators.

Figure 2:
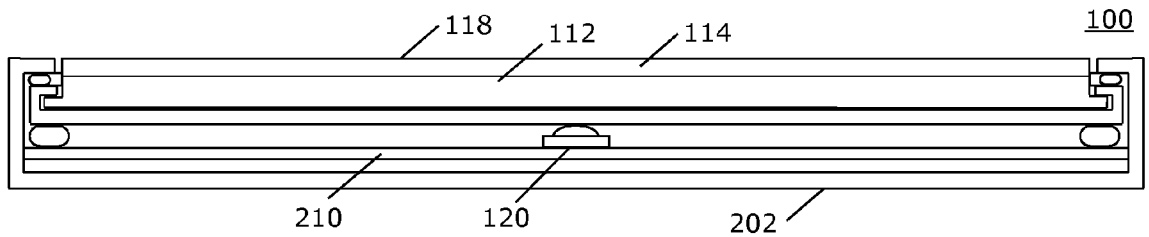
FIG. 2 is a sectional side view of a portable electronic device with a mechanical actuator in accordance with the disclosure.

A sectional side view of a portable electronic device 100 with a mechanical actuator 120 is shown in FIG. 2. The cross section is taken through the center of the actuator 120. The portable electronic device 100 includes a housing 202 that encloses components such as shown in FIG. 1. A base 210 extends between the sidewalls of the housing and supports the actuator 120, which is a mechanical dome switch actuator in the example of FIG. 2. For a mechanical dome switch/actuator, tactile feedback is provided when the dome collapses due to imparted force and when the dome switch/actuator returns to the rest position after release of the switch.

Alternatively, the actuator 120 may comprise one or more piezoelectric (piezo) devices 402 that provide tactile feedback for the touch-sensitive display 118. Contraction of the piezo actuator 120 applies a spring-like force, for example, opposing a force externally applied to the touch-sensitive display 118. Each piezo actuator includes a piezoelectric device 402, such as a piezoelectric ceramic disk adhered to a substrate 404 that may comprise metal and/or another flexible or elastically deformable material. The substrate 404 bends when the piezo device 402 contracts due to charge/voltage across the piezo device 402 or in response to a force, such as an external force applied to the touch-sensitive display 118. The charge/voltage may be adjusted by varying the applied voltage or current, thereby controlling the force applied by the piezo device 402. The charge/voltage may advantageously be removed over a relatively short period of time to provide tactile feedback. An element 408 and an optional force sensor 122 may be disposed between the piezo actuator 402 and the touch-sensitive display 118 to facilitate actuation of the piezo actuator and/or the optional force sensors 122. The piezo actuators 120 may be controlled to provide various forms of tactile feedback, for example, a vibration to notify of an incoming call or text message or simulation of a dome switch upon depression of the touch-sensitive display 118.

Figure 3:
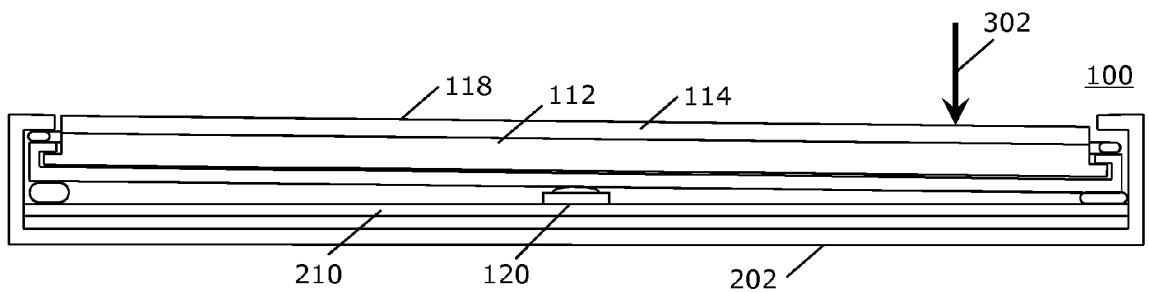
FIG. 3 is a sectional side view of a portable electronic device with a depressed mechanical actuator in accordance with the disclosure.
Figure 4:
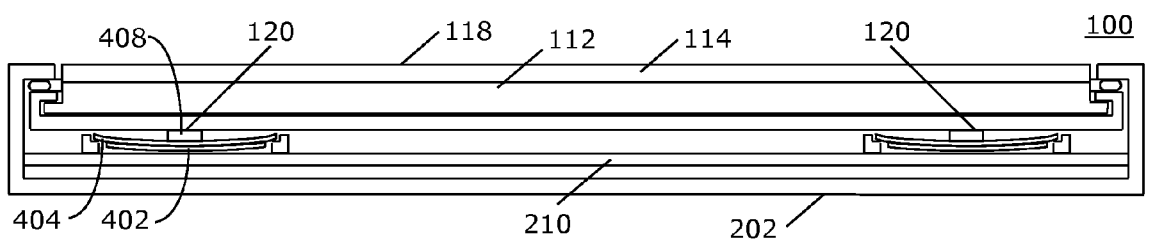
FIG. 4 is a sectional side view of a portable electronic device with piezoelectric actuators in accordance with the disclosure.
Figure 5:
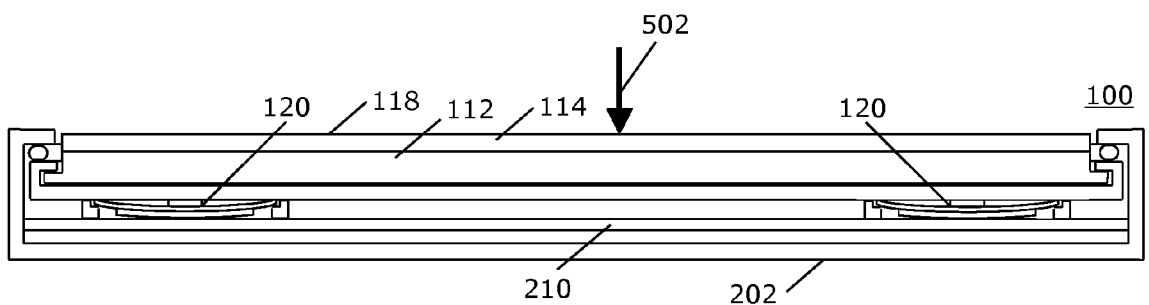
FIG. 5 is a sectional side view of a portable electronic device with depressed piezoelectric actuators in accordance with the disclosure.

The touch-sensitive display 118 is moveable and depressible with respect to the housing 202, and is shown floating with respect to, i.e., not fastened to, the housing 202 in the examples of FIG. 2 through FIG. 5. As the touch-sensitive display 118 moves toward the base 210, the actuator 120 is depressed or actuated as shown in FIG. 3 and FIG. 5, for example, in response to a force 302, 502 applied to the touch-sensitive display 118. The processor 102 receives a signal when the actuator 120 is depressed or actuated, which signal may trigger a selection or other input to the portable electronic device 100.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming. Force as utilized throughout the specification, including the claims, refers to force measurements, estimates, and/or calculations, such as pressure, deformation, stress, strain, force density, force-area relationships, thrust, torque, and other effects that include force or related quantities.

Typically, when a user views information while in an application on a portable electronic device 100, information for that application alone is displayed in the window, also known as a field, where the application is open or launched. As described below, that same window may be utilized to at least temporarily display information from one or more additional sources or applications. Given the relatively small area available for display on a portable electronic device 100, the window is typically the display area, except for area that may be utilized as a header, a footer, and so forth. Unlike larger computer monitors, viewing information on existing portable devices for two applications is typically performed by displaying one application at a time due to the smaller display size. As described below, the same window or display area may be utilized to continuously view information from multiple sources, such as applications. For example, while received emails are displayed, a user may need to view future actions, such as calendar events or tasks. When an appropriate input, such as a gesture is received, upcoming calendar events may be viewed continuously with the emails as described below. For example, emails displayed with the most recently received email on top may be viewed effectively continuously with the nearest calendar event displayed on the bottom or nearest to the most recently received email. Information from multiple sources or applications may be displayed in a single window or field, where information may be combined in a useful manner, such as by time, by contact, by other parameter or category, and so forth. For example, a single stream of information can be viewed in chronological order, with the future actions being optionally selected for viewing.

Figure 6:
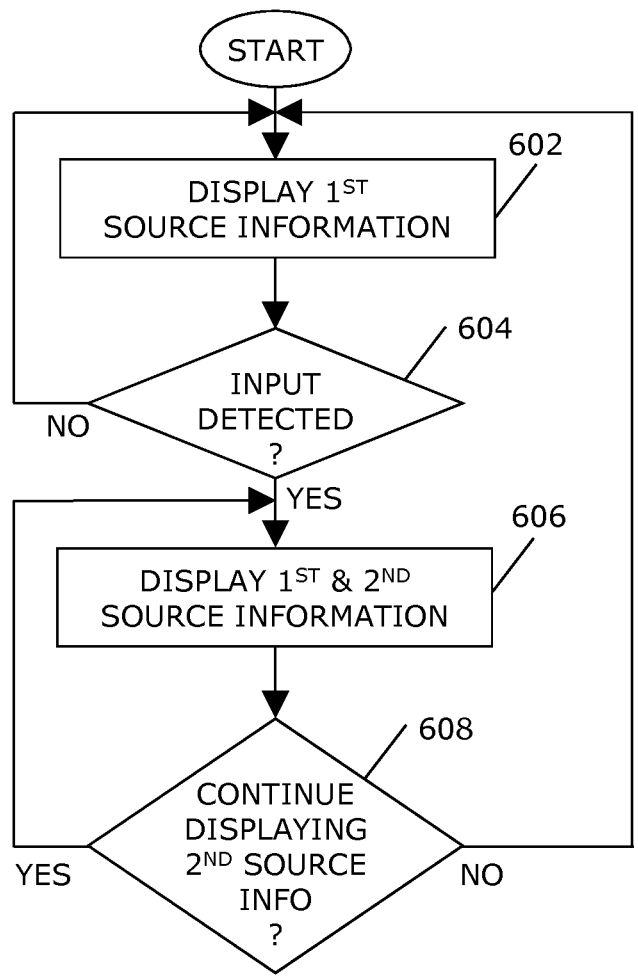
FIG. 6 is a flowchart illustrating a method of displaying information for a plurality of applications in accordance with the disclosure.

A flowchart illustrating a method of displaying information for a plurality of applications of an electronic device is shown in FIG. 6. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, device, or apparatus, which may be a non-transitory or tangible storage medium.

Information associated with a first source, such as a first application, referred to as first information, is displayed 602 on a display, for example, on a touch-sensitive display 118. The information may be information associated with any suitable source or application, such as email, text messaging, calendar, tasks, address book or contacts, media player, or any other suitable application in which information is displayed by an electronic device 100. Information associated with email may include a list of email messages, information associated with a calendar may include meeting schedule, calendar day view, week view, month view, or agenda view, information associated with an address book may include a listing of contacts, information associated with a media player may include text, pictures, videos, or artwork related to music or other media. The information is not limited to the examples provided.

An input, such as a gesture, is detected 604. Detection of the input triggers display of information for a second source, such as a second application. The second application may be any suitable application, such as described above. The information associated with the second application is also described above. The input may be considered to be a command associated with a second application, which command requests or causes at least some information associated with the second source or application to be displayed.

Figure 7:
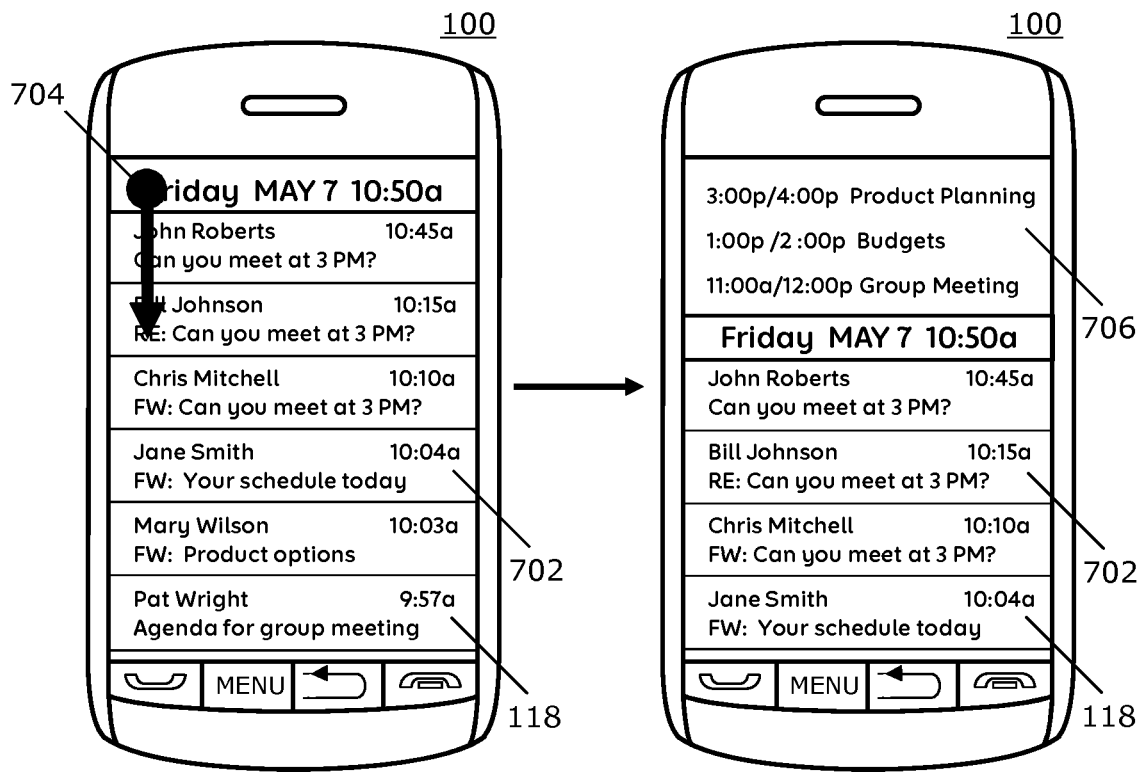
FIG. 7, FIG. 8, FIG. 9, FIG. 10, and FIG. 11 illustrate examples of displaying information for a plurality of applications in accordance with the disclosure.

An appropriate input is advantageously assigned as the input such that unintentional display of information associated with the second source or application is avoided. Thus, the input, such as a gesture, is associated with the second source or application. The input may be associated with a specific location, such as a side or corner of the touch-sensitive display 118, or a displayed element, such as a special indicator, e.g., a ghosted symbol or word, or a header for an application, e.g., the header "FRIDAY May 7 10:50 a" as shown in FIG. 7, and end of the displayed information associated with the first application, and so forth. The input may be a gesture having detectable attributes or characteristics, such as movement, direction, change in direction, shape, duration, length, force, speed, time associated with a given location as with a hover, number of simultaneous touch locations, number of taps, use in conjunction with a physical key, button, or other input device, and so forth. The input may be depression of a touch-sensitive display 118 that actuates an actuator 120, such as described above. The input may be provided while any end of the information associated with the first application is displayed. The input may be provided by selection from a menu. The input may be any combination of the above.

Figure 9:
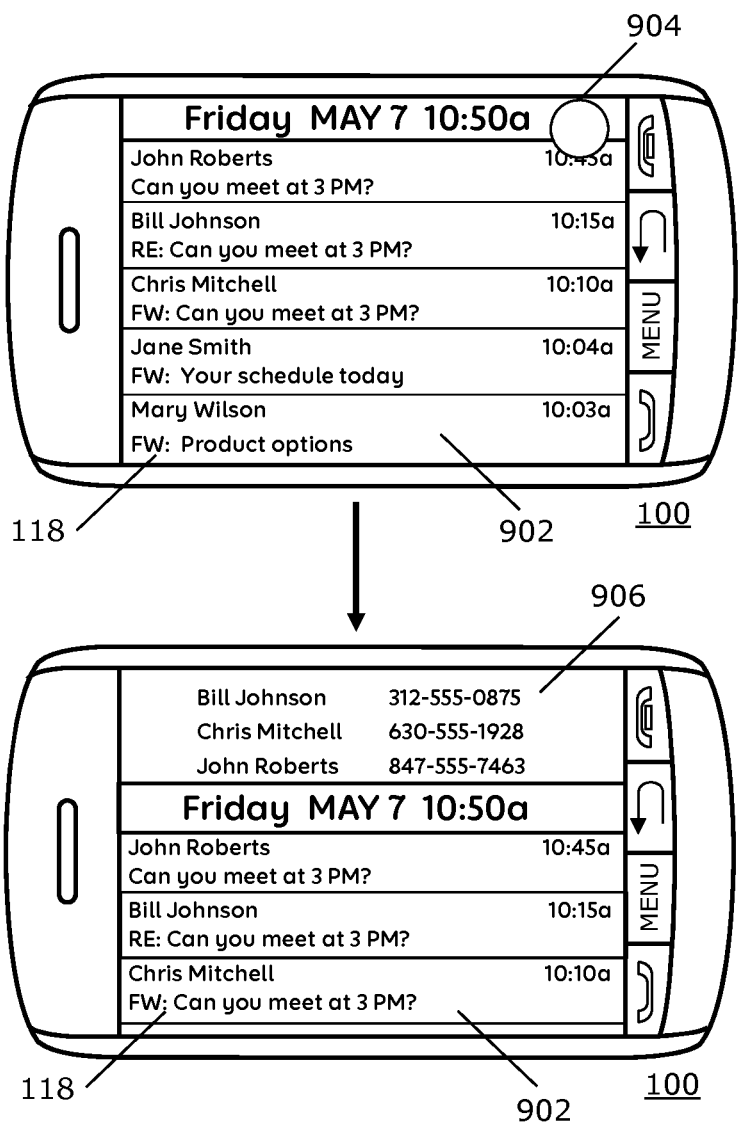
Figure 10:
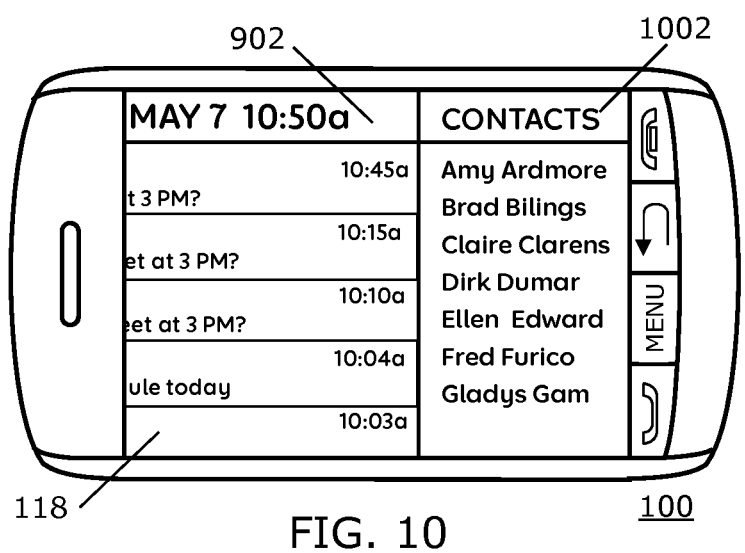

A few examples of an input are as follows. The input may be a gesture that extends substantially from one end of the display 118 to an opposite end of the display 118, such the swipe 804 shown in FIG. 8. The gesture may alternatively move across the narrow part of the display 118, e.g., at a right angle to the swipe 804 shown in FIG. 8. The input may be a hover or other gesture that remains associated with a specific location for a period of time, such as the sustained touch 904 at a location associated with a corner of the touch-sensitive display 118 where part of the header for the email application is displayed as shown in the example of FIG. 9. The input, such as a gesture, may be provided while any end of the information associated with the first application is displayed. The input may be associated with any end of the first information, such as the beginning of the information, the last part of the information, or a side of the information, such as the left side or right side of the displayed information, such as shown in FIG. 10. The input may be a compound gesture, for example, a touch sustained at a specific location, such as a corner or side of the display, while a swipe is detected. When the input is a gesture, the gesture need not be limited to a gesture input via an input device, e.g., a touch-sensitive display, optical joystick, and so forth, but may include other types of gestures such as 3D gestures or physical gestures involving movement of the electronic device 100.

Information associated with the second source, such as an application, referred to as second information, is displayed 606. The second information may be displayed at any end of the first information. For example, the second information may be displayed at the end of the first information that is displayed when the gesture is detected 604. In another example, the second information may be displayed at the end of the first information that is associated with the gesture, such as the left or right side of the display, such as shown in FIG. 10. The second information may be scrolled through after scrolling through the first information. For example, when a swipe begins on the display 118 and proceeds at least to any end of the display 118, the first information and the second information may be scrolled through substantially contiguously. Thus, both the first information and the second information may be displayed in a continuous stream of information, and information for two or more applications may be displayed at the same time. The second information may be displayed in any order, including chronological, reverse chronological, alphabetical, reverse alphabetical, most often accessed, and so forth. The information from two or more sources, such as applications, may be combined and displayed, rather than appending the information together.

The second information may be a preview of information, e.g., a subset of all the second information. For example, when the second application is email, the last five emails may be displayed, when the second application is an address book, the ten most often accessed contacts may be displayed, and so forth. The preview may be displayed without opening or launching the second application, in which case the previewed information may be retrieved from stored information and/or information received via a communication network 150. Alternatively, the second application may be launched or opened upon detection of the gesture.

The second information may continue 608 to be displayed, including scrolled through, as long as any second information remains on the display 112. For example, after all the second information has scrolled off the display 112, the first information, and not the second information, is displayed until a subsequent detection of an appropriate input, such as a gesture described above. In other words, when the input is not detected, scrolling through the first information stops when the end of the information is displayed, e.g., at an end of the display 112.

The second information may continue to be displayed for a predetermined time period, such as 5 or 10 seconds, which time period may be selected by a user and stored in a user profile. Second information may alternatively be discontinued 608 when an input, similar to or dissimilar to the gesture at 604, is detected. For example, if a clockwise circular gesture triggers display of the second information, a counter-clockwise circular gesture may discontinue display of the second information.

The present method may optionally be applied to two or more applications in addition to the first application. For example, once the second information is scrolled through, information associated with a third application may be displayed upon detection of an appropriate input, much the same way the second information is displayed when an input is detected during display of first information. Any number of applications may be displayed by repeating the process. For example, a long swipe during display of first information results in display of second information, and a second long swipe during display of the second information results is display of third information. Alternatively, a single input may display information from any number of sources or applications.

Alternatively, a different application may be associated with different ends of the information. For example, a gesture associated with the newest displayed emails may result in display of calendar information, a gesture associated with the oldest displayed emails may result in display of an address book, a gesture associated with the left side of the displayed emails may result in display of tasks, and a gesture associated with the right side of the displayed emails may result in display of media player controls.

A user profile may be utilized to store various options associated with the method, which options may be selected by a user. For example, a user may select which application opens when information for a given application is displayed. When multiple applications are opened or multiple sources of information are accessed, the order of the applications or sources may be stored. Applications associated with different ends of any source or application may be selected and stored. The input that triggers secondary source or application display may be selected and stored, for example, a hover, a swipe, a circle gesture, and so forth. A time duration for detection of a gesture may be stored in the profile. Time of display of the second information may be selected by the user and stored. How much information is displayed from a second source or application may be stored and selected, e.g., how many emails, contacts, logged phone calls, and so forth. When a second (which may be opened later than the first application) application is previewed or opened or launched. Options related to how the information is displayed may be included in the profile, including end-to-end display, combination of sources, order of combined sources such as chronological or time order, and so forth. Any other information related to the method may optionally be selected and stored in the user profile.

Examples of displaying information for a plurality of applications are shown in FIG. 7, FIG. 8, FIG. 9, FIG. 10, and FIG. 11. Although these examples show information displayed for an email application when the input is detected, any application may be displayed. While email application information 702 is displayed in FIG. 7, an input comprising a downward swipe 704 that begins at the end of the email information causes calendar information 706 to be displayed at that end of the email information.

Figure 8:
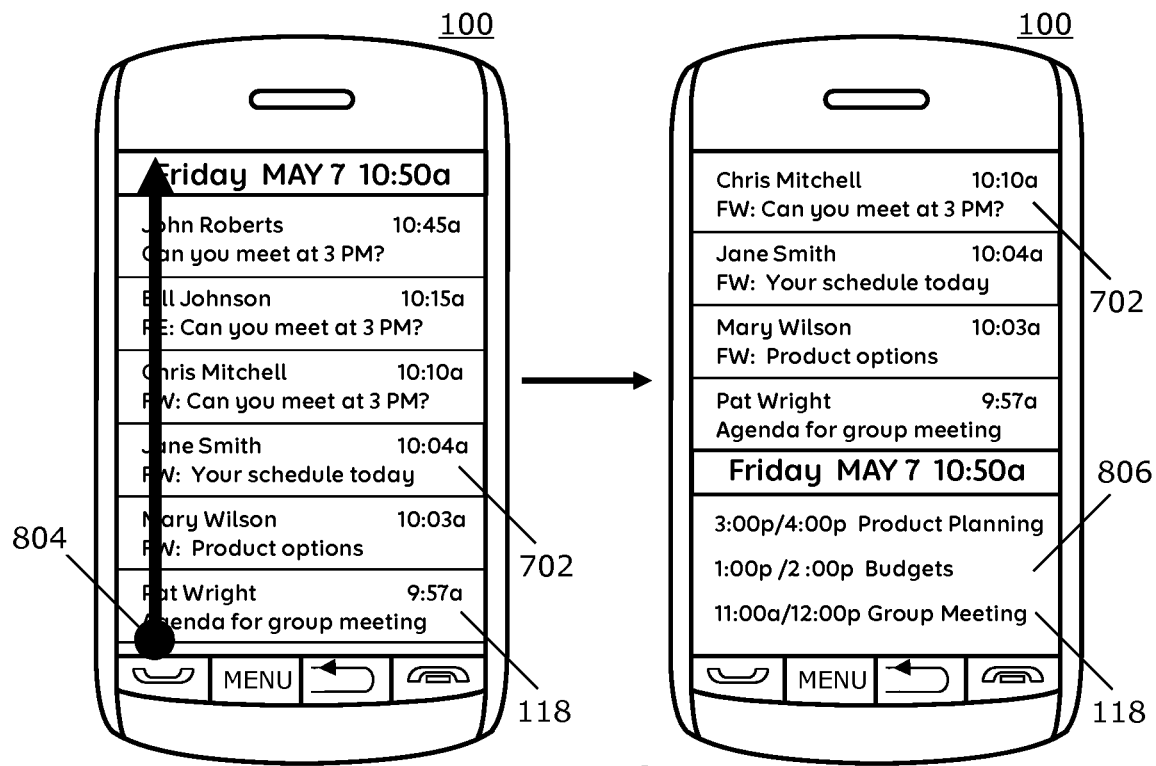

While email application information 702 is displayed in FIG. 8, an input comprising an upward swipe 804 that begins at the bottom end of the touch-sensitive display 118 and ends at the opposite end of the touch-sensitive display 118 causes calendar information 806 to be displayed at that end of the email information, which is the bottom end of the email information in this example.

The method may be applied when information displayed in either portrait, such as shown in FIG. 7 and FIG. 8, or landscape orientations, such as shown in FIG. 9 and FIG. 10. While email application information 902 is displayed in FIG. 9, an input comprising a sustained touch 904, also referred to as a hover, is detected at a location associated with a corner of the display where a header for email information is displayed. Contact information 906 is displayed at that end of the email information.

While email application information 902 is displayed in FIG. 10, an input, such as a gesture associated with the right side of the display is detected, and contact information 1002 is displayed at right side of the display. FIG. 10 shows the transition from display of emails to display of contacts.

Figure 11:
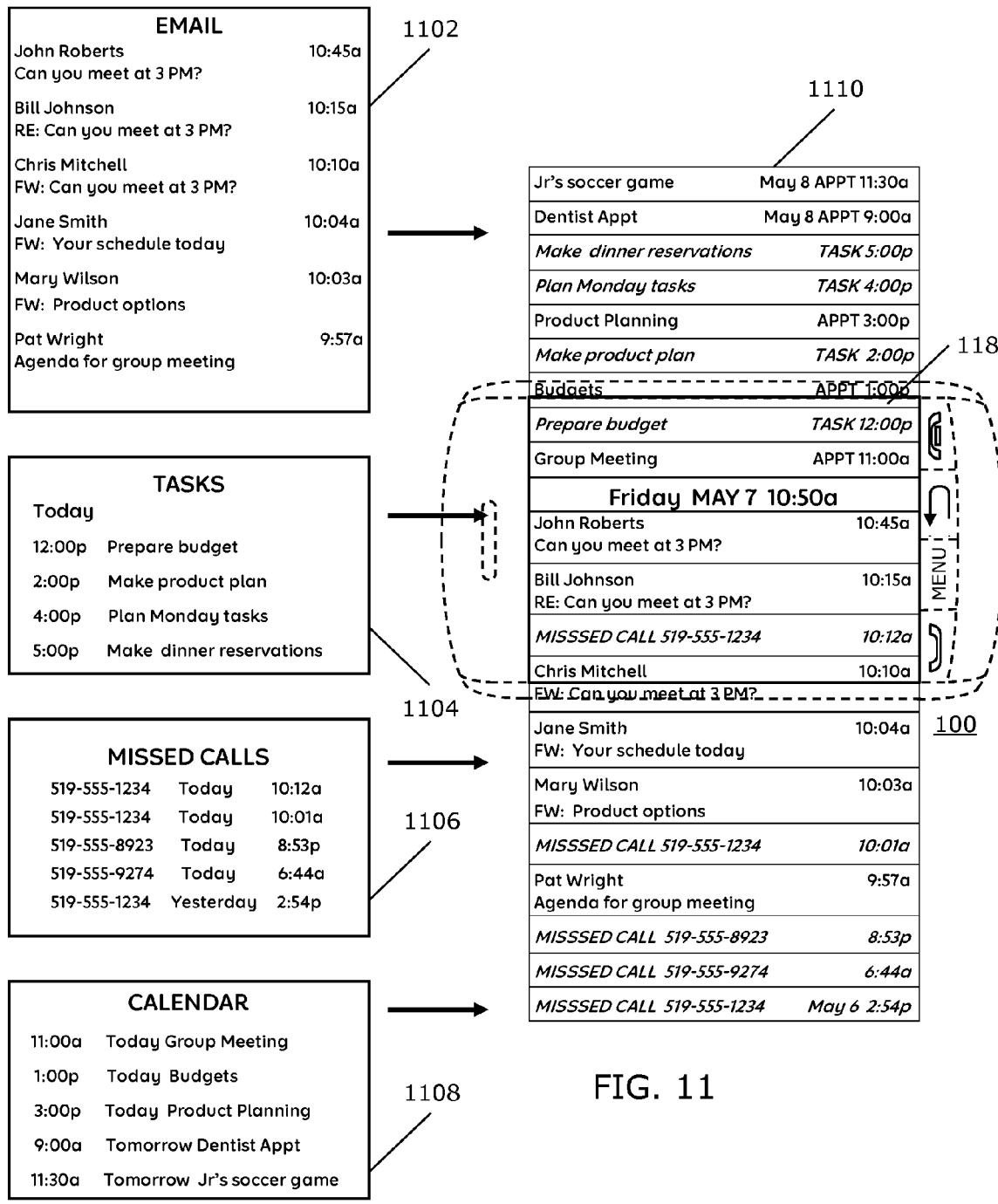

Alternatively, information may be displayed in a combined manner, such that information from two or more sources is combined and displayed. An example is shown in FIG. 11, which illustrates combination of information from four different sources, email, tasks, missed calls, and calendar. For example, in order to respond to John Roberts 10:45 AM email asking whether a user can meet at 3 PM, the user may need information from multiple sources, such as the calendar, task list, and missed calls, to answer the question. Existing portable devices typically require the user to separately open an application for each of these sources, requiring numerous steps and time.

As shown in FIG. 11, information associated with four sources or applications, email 1102, tasks 1104, missed calls 1104, and calendar 1108, is combined into a single list or grouping of information 1110 that is displayed. The portable electronic device 118 is shown in dashed lines to more clearly illustrate the list of information 1110. When the information 1110 is displayed in one window or field of the display 118, the list may advantageously be scrolled through. The list may be referred to as an extended list or extended message list. The information may optionally be combined according to a parameter, such chronological or time order, for further advantage, such as shown in FIG. 11. The user is provided with a combined list of information that is easily scrolled through to determine and answer to the question from John's email. Further, the user is provided with the ability to reply to the email from the same list of information. Optionally, the portable electronic device 100 need not launch or open the applications associated with the tasks, missed calls, or calendar. This information may be obtained, for example, from information stored on the portable electronic device 100.

Optionally, formatting of information on the extended list may be provided to provide more easily identifiable information. For example, different sources of information may have different formatting, such as italicizing, shading, highlighting, coloring, and so forth. For example, the missed calls and tasks are italicized in the extended list 1110 of FIG. 11. Dates may optionally be added to the list when information is associated with multiple dates. For example, May 8 is added to the appointments at the top of the list 1110 and May 6 is added to the missed call at the bottom of the list 1108. The current date and time may be displayed at a point in a chronological list where the current time and date fit chronologically, such as shown in FIG. 11. Display of current date and time more easily identifies the separation of past and future items in the list 1110.

Figure 12:
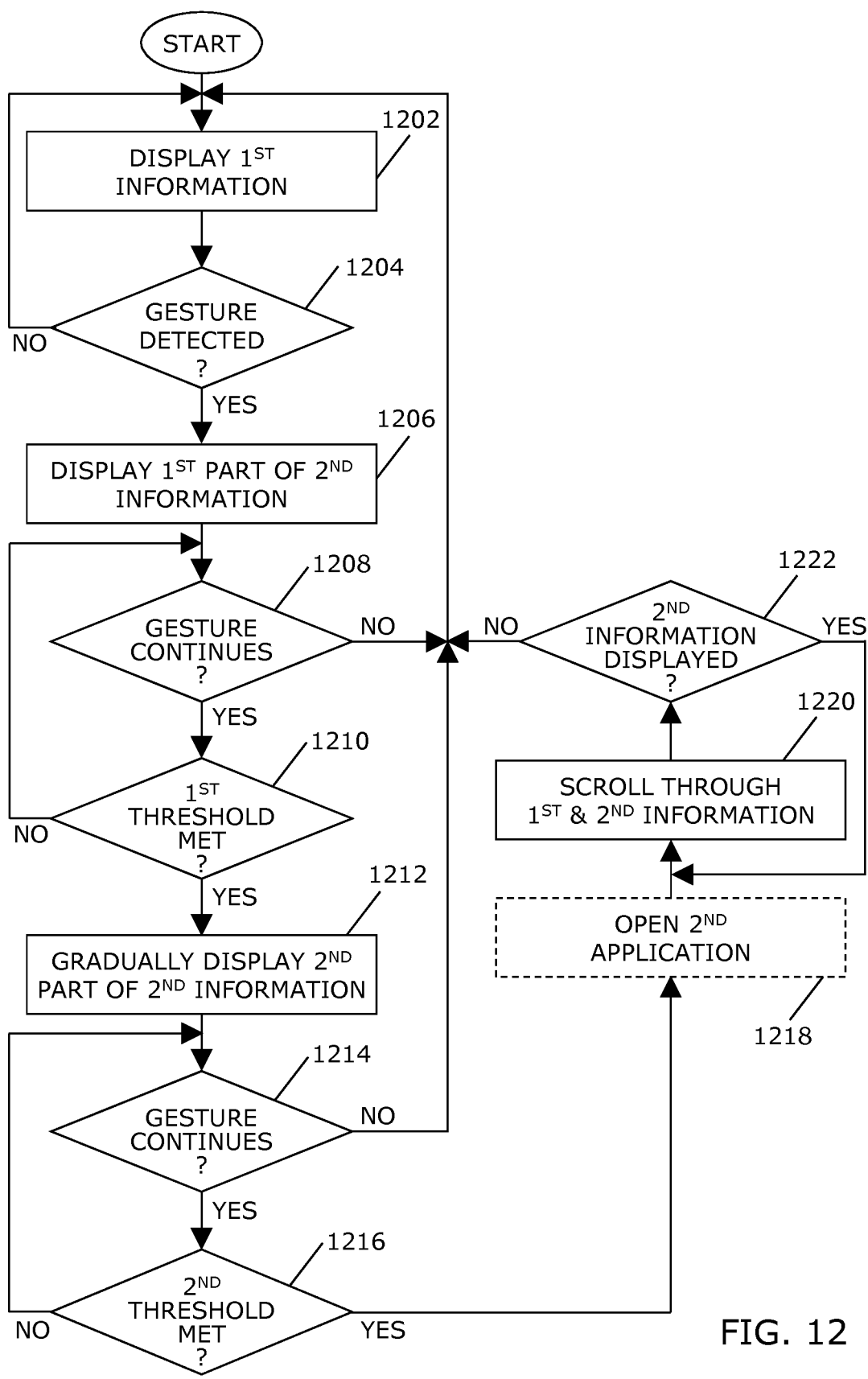
FIG. 12 is a flowchart illustrating a method of displaying information in response to a gesture in accordance with the disclosure.

A flowchart illustrating a method of displaying information in response to a gesture is shown in FIG. 12. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the electronic device to perform the method may be stored in a computer-readable medium, device, or apparatus, which may be a non-transitory or tangible storage medium. The method may be applied in landscape or portrait orientation.

First information associated with a first source, such as a first application is displayed 1202 on a display, for example, on a touch-sensitive display 118 of an electronic device 100 such as a portable electronic device. The first application may be any suitable application, such as described above. The first information associated with the first application is also described above.

An input, such as a gesture, is detected 1204. Detection of the input triggers display of second information for a second source, such as a second application. The second application may be any suitable application, such as described above. The information associated with the second application is also described above. The input may be considered to be a command associated with a second application, which command requests or causes at least some information associated with the second source or application to be displayed. A number of gestures and gesture characteristics are described above. The gesture may be first detected at or near an edge of the display.

A first part of the second information is displayed 1206. The second information may be displayed at any end of the first information. For example, the first part of second information may be displayed at the end of the first information that is displayed when the gesture is detected 1204. The first part of second information may be displayed at the end of the first information that is associated with the gesture, such as the left or right side of the display, such as shown in FIG. 10, or the top or bottom of the information, such as shown in FIG. 13 through FIG. 24. The first part of the second information may be, for example, a next calendar event, a next task, a future event, a contact, a next email, a next text message, a few lines of text, and so forth. The first part of the second information may be gradually displayed upon detection of the first part of the gesture. Display of the first part of the second information may increase along with movement of the gesture. For example, the information may progressively move onto the display as the gesture continues, e.g., an amount of the first part of the second information may correspond to a distance of the first part of the gesture. Optionally, none of the second information may be displayed, and an indication of detection of the gesture may be displayed instead, such as an icon or symbol, or a change in the display of the first information, such as a format change, blinking of information, or other indication.

When the gesture is no longer detected at 1208, display of the second information discontinues, and the first information is displayed at 1202. For example, the user may realize that an inadvertent gesture caused display of a small amount of the second information or the indication of detection of the gesture, and the user may discontinue the gesture. Alternatively, the user may only be interested in the first part of the second information, and may discontinue the gesture.

While the gesture continues to be detected 1208, and the gesture does not meet a first threshold 1210, no additional amount of the second information is displayed beyond the first part. By limiting the amount of the second information that is displayed before the gesture meets a first threshold, display of more of the second information is avoided when the gesture is inadvertent or unintended. Avoiding such inadvertent display prevents excess processing and display of undesired information, thus reducing needed processing and power resources. Thus, prior to the gesture meeting the first threshold, no more than the first part of the second information may be displayed while the gesture continues, such as when the gesture comprises movement. After the first part is displayed, when the gesture continues without meeting the threshold, no change in display of the second information may occur. The first threshold may comprise a distance of the gesture or a distance from an edge of the display, such as an edge where the gesture originated. For example, the threshold may be 25% of the height of the display, 2 cm, 6 lines of text, and so forth. Alternatively, the first threshold may comprise a predetermined time period, such as 1 second. Other thresholds and threshold values may be utilized.

When the gesture continues to be detected 1208 and after the gesture meets the first threshold 1210, a second part of the second information is displayed, e.g., following the display of the first part of the information. The second part of the second information may be gradually displayed along with movement of the gesture. The amount of the second part of the second information may correspond to a distance of the gesture after the gesture meets the first threshold. Less of the first information may be displayed as more of the second information is displayed. The first information and the second information may be combined in a scrollable list. The first information and the second information may be chronologically ordered, such as when the first information includes an inbox or email information and the second information includes calendar events or tasks. The second information may comprise future events or information. The first information and the second information may be displayed and scrolled in a single window or field. The second information may be scrolled through after scrolling through the first information. For example, when a swipe begins on the display 118 and proceeds at least to any end of the display 118, the first information and the second information may be scrolled through substantially contiguously. Thus, both the first information and the second information may be displayed in a continuous stream of information, and information for two or more applications may be displayed at the same time. The second information may be displayed in any order, including chronological, reverse chronological, alphabetical, reverse alphabetical, most often accessed, and so forth. The information from two or more sources, such as applications, may be combined and displayed, rather than appending the information together.

When the gesture is no longer detected at 1214, display of the second information discontinues, and the first information is displayed at 1202. Display of as much of the second information as the user is interested in seeing may have occurred, and the user may discontinue the gesture.

When the gesture continues to be detected 1214 and after the gesture meets a second threshold 1216, the second application may optionally be opened or launched 1218. The second application may or may not be running or launched when the gesture is initially detected. Detection of the gesture need not trigger opening or launching of the second application. The second information may be stored for future display in response to the gesture, thus the second information may be displayed without needing to open or launch the second application. Optionally, the second information displayed prior to the gesture meeting the second threshold may not be selectable, and the second information displayed after the gesture meets the second threshold may be selectable. The second threshold is longer than the first threshold. For example, the second threshold may be 50% of the height of the display, 4 cm, 12 lines of text, 4 items displayed from a list, and so forth. Alternatively, the second threshold may comprise a predetermined time period, such as 2 seconds. Other thresholds and threshold values may be utilized.

When the gesture continues to be detected 1214 and after the gesture meets a second threshold 1216, the first information and the second information may be scrolled through 1220, for example, as a single list is scrollable. For example, when the gesture meets the second threshold, the second information may automatically expand to fill the window or field, and the first information is no longer displayed with the second information, although the first information is available for scrolling as the gesture continues. Continuation of the gesture results in scrolling through the information in any direction, including back and forth or in a reverse direction, such as described above. One manner of ending the display of the second information includes scrolling the second information off the display 1222. After the second information is scrolled off the display 1222, the process continues at 1202, where the first information is displayed without displaying the second application. The process repeats when the gesture is detected again. Optionally, the process of FIG. 12 may be applied to a third application, where a gesture is detected that requests display of third information for the third application. The gesture may be the same gesture described above or an additional gesture. The third information may be displayed, for example, at the bottom of the first information, in between the first information and the second information, to the side of the first information and/or the second information, such as shown in FIG. 10, and so forth. Alternatively, the third information may be combined together with the first information and the second information in a single list, which may optionally be chronologically organized, such as shown in FIG. 11. Optionally, a single gesture may combine information for multiple applications into a single list, such as shown in FIG. 11, and an optional gesture may uncombined the list and return to display of the first information. Examples applying the flowchart are shown in FIG. 13 through FIG. 24.

Figure 13:
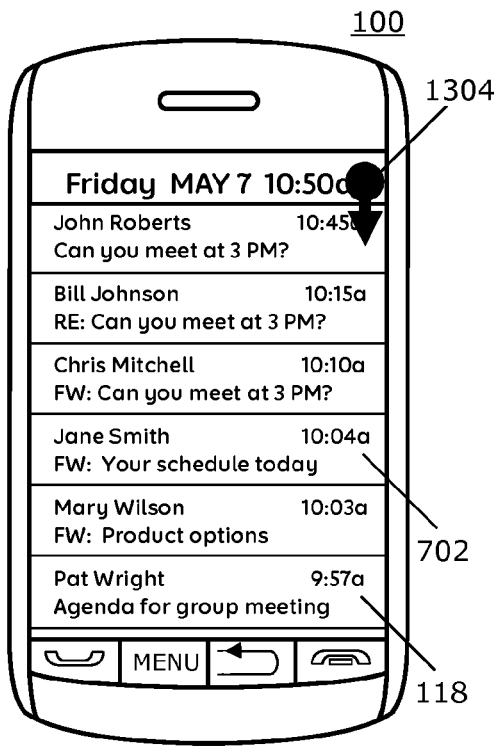
FIG. 13 through FIG. 24 illustrate examples of displaying information in response to a gesture in accordance with the disclosure.
Figure 14:
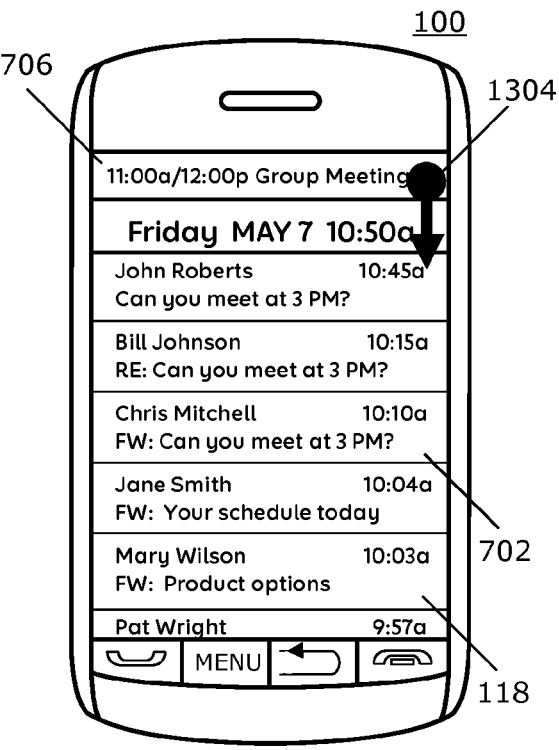
Figure 15:
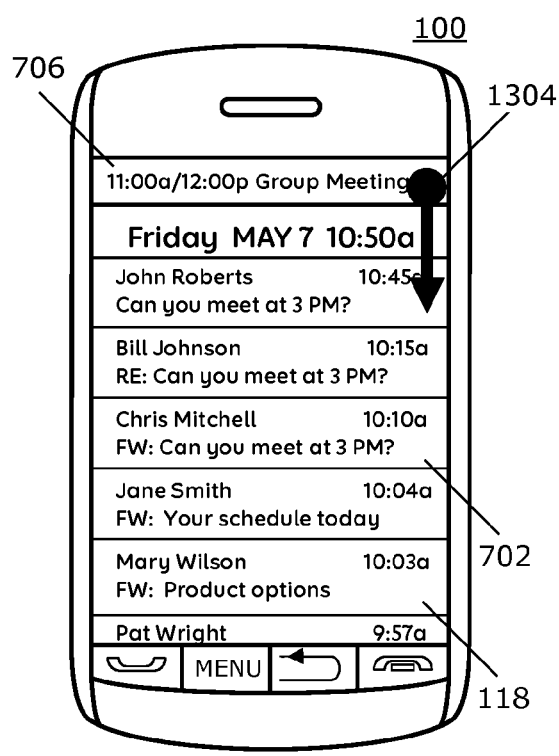
Figure 16:
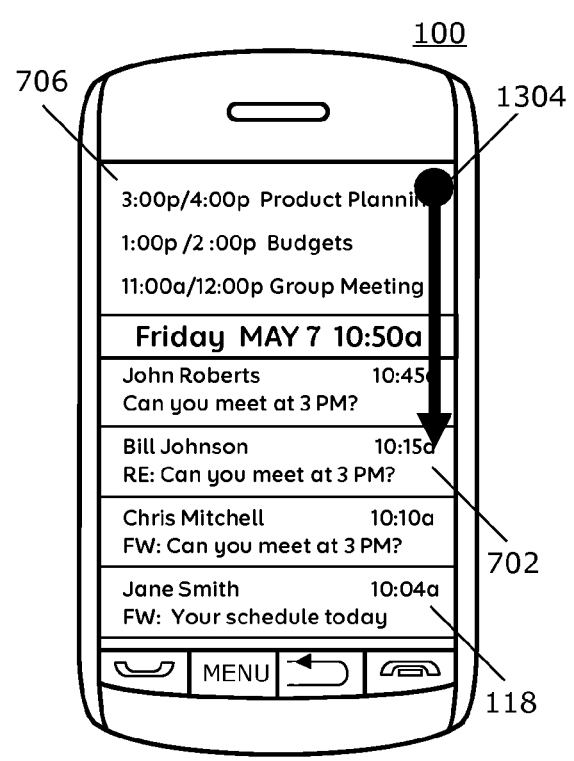

An example of display of information in response to a gesture is shown in FIG. 13 through FIG. 16. In this example, the first information is an inbox, such as a unified inbox, and the second information is calendar information. Alternatively, an email may be displayed as the first information, and contact information, task information, or calendar information may be displayed as the second information. Other information may be displayed. The first part of the gesture 1304 is detected in FIG. 13, while an inbox is displayed. In response to detecting the first part of the gesture 1304, a first part of the second information 706 is displayed as shown in FIG. 14. In this example, the first part of the second information 706 comprises a next calendar event. Although a second part of the gesture 1304 is detected subsequent to the first part of the gesture 1304 in FIG. 15, no further display of the second information is provided because the gesture has not met the first threshold. Thus, display of the first part of the second information 706 is maintained. Thus, the gesture has a resistive or delayed character before more of the second information 706 is displayed. The gesture may act in a resistive or sticky manner, for example, as a spring, magnet, or other resistive device, as if a force is overcome by the gesture before additional second information 706 is displayed freely, e.g., display of second information 706 increases or decreases along with movement of the gesture. No more than the first part of the second information 706 may be displayed prior to the gesture meeting the threshold, or while the gesture continues up to a predetermined length in distance or time. When the gesture 1304 meets the first threshold, an additional or second part of the second information 706 is displayed as shown in FIG. 16. The third part of gesture is subsequent to the second part of the gesture and is the part of the gesture past the first threshold. The amount of the additional part of the second information 706 may correspond to a distance of the third part of the gesture. For example, if 3 calendar events are displayed in 2 cm of the display, when the gesture continues 2 cm, 3 calendar events are displayed. When the gesture reverses direction, fewer calendar events are disclosed. The first information 702 is displayed in the remainder of the window or field.

Display of second information in response to inadvertent gestures is reduced, and unnecessary display is avoided when the gesture shown in FIG. 13 through FIG. 16 is utilized. Other gestures may be successfully utilized, such as described above.

Display of the second information may optionally be enhanced with formatting. The second information may be displayed in a different format prior to the gesture meeting the second threshold. After the gesture meets the second threshold, the second information may be displayed in the same format as the first information. For example, by gradually changing the formatting of the second information as the gesture continues, an indication may be provided of how near the second threshold is. When the gesture is discontinued prior to meeting the second threshold, display of the second information ends. The end of the display of the second information may be immediate, such as immediate discontinuation of the second information, or more gradual, where the information quickly slides off the display in the opposite direction to how the second information was displayed, such as with an animation. This end of display of the second information may be referred to as a snapback of the second information. When the gesture continues past the second threshold, the second information expands to fill the window or field, displacing the first information. Formatting provides an indication to the user of what will happen with display of the second information if the user discontinues the gesture. Alternative formats include providing or adding a background, such as a background color or texture, shading, highlighting, tinting, coloring of text, adding a band along the side of the second information, and so forth.

Figure 17:
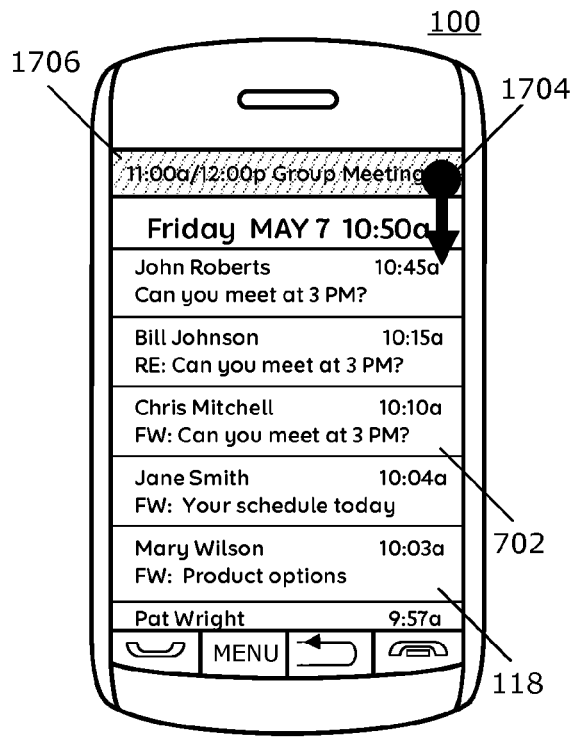
Figure 18:
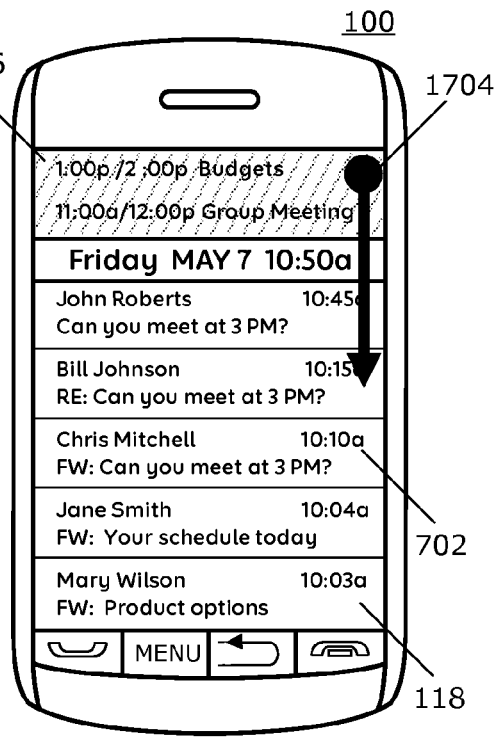
Figure 19:
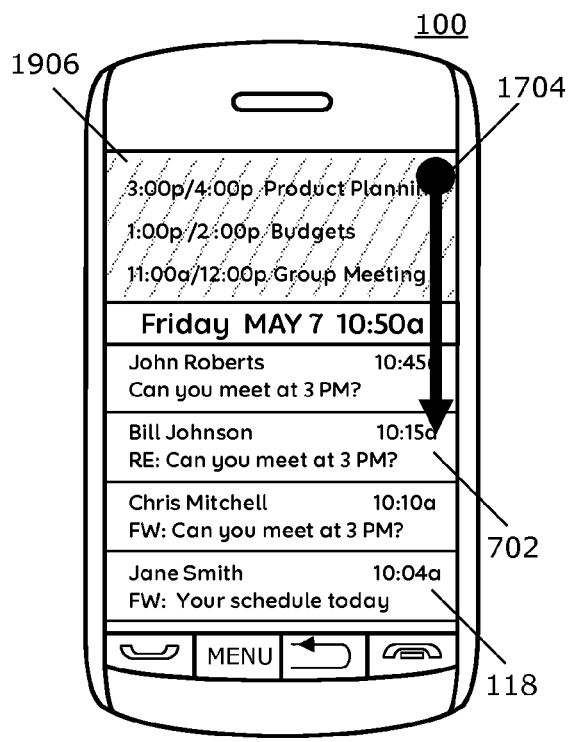
Figure 20:
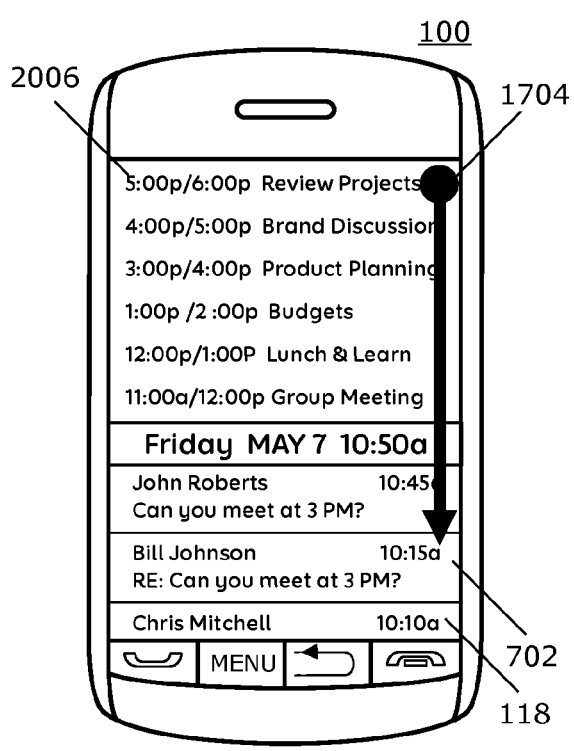

An example of applying alternate formatting of the second information is shown in FIG. 17 through FIG. 20. In this example, the first information is an inbox, such as a unified inbox, and the second information is calendar information. Alternatively, an email may be displayed as the first information, and contact information, task information, or calendar information may be displayed as the second information. The second information may comprise further events or information. Other information may be displayed. In this example, FIG. 17 occurs after FIG. 13, where the first information 702 is displayed when the gesture is initially detected. The second information 1706 begins to be displayed as shown in FIG. 17 in an alternative format than the first information 702 as the gesture 1704 continues. In this example, the formatting comprises a narrow cross-hatching of the second information 1706 in FIG. 17. When the gesture 1704 continues, more of the second information 1806 is displayed as shown in FIG. 18, where the formatting of the second information 1806 includes cross-hatching that is wider than the cross-hatching shown in FIG. 17. When the gesture 1704 continues further, even more of the second information 1906 is displayed as shown in FIG. 19, where the formatting of the second information 1906 includes cross-hatching that is much wider than the cross-hatching shown in FIG. 17 and wider than the cross-hatching shown in FIG. 18. In this example, the cross-hatching is gradually widened as the gesture continues. The wider the cross-hatching, the closer the gesture is to the second threshold. Thus, the formatting of the second information is gradually changed as the gesture continues. The gesture 1704 continues and meets the threshold, and the alternative formatting is discontinues, as shown in FIG. 20, where the first information 702 and the second information 2006 are displayed in the same format, e.g., unaltered. When the gesture 1704 is discontinued at the point shown in FIG. 20, the second information is expanded to fill the window or field. When the gesture 1704 discontinues at any point in length from FIG. 17 through FIG. 19 (before the gesture 1704 meets the second threshold), display of the second information discontinues, and the first information is displayed, such as shown in FIG. 13.

Figure 21:
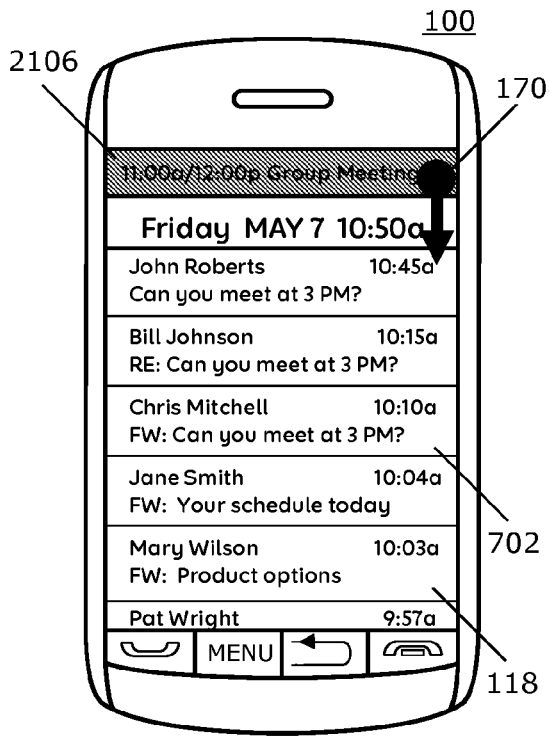
Figure 22:
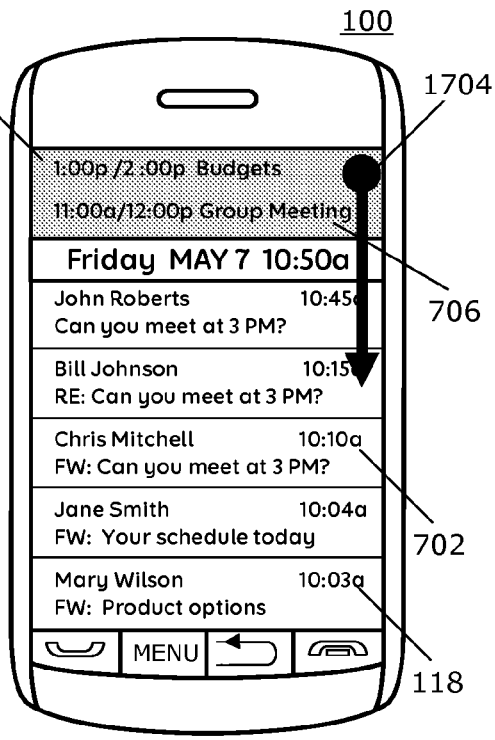
Figure 23:
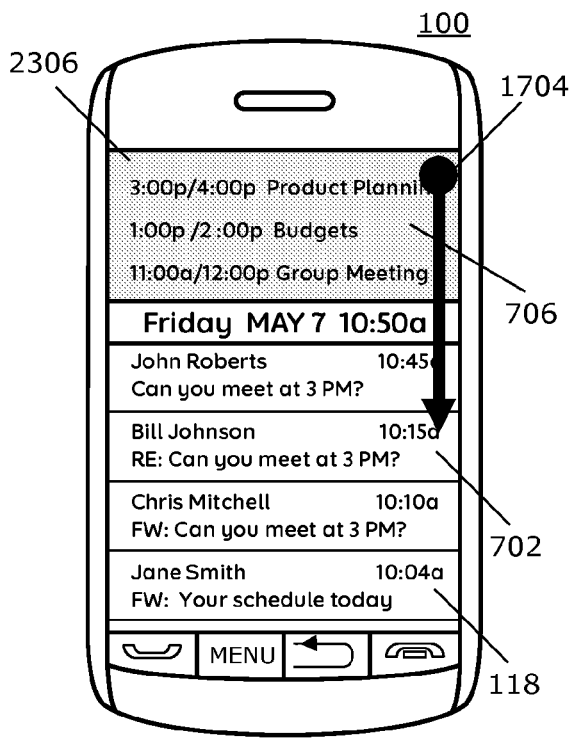
Figure 24:
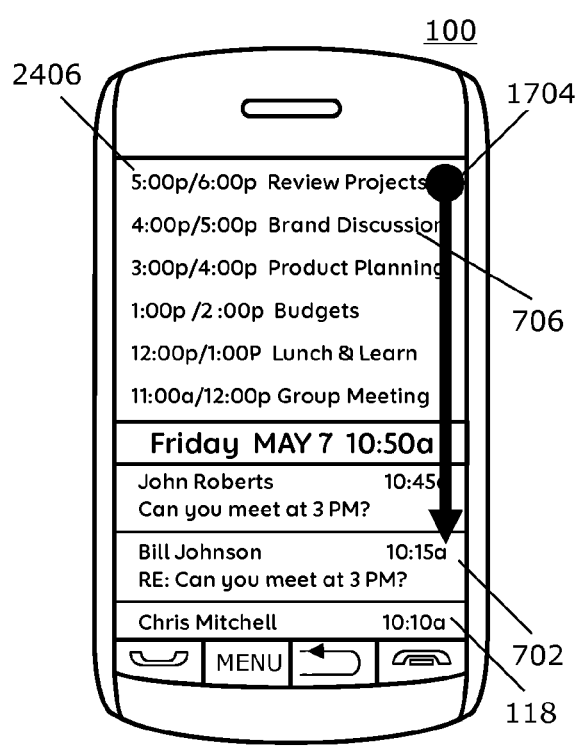

An example of applying alternate formatting of the second information is shown in FIG. 21 through FIG. 24. In this example, the first information is an inbox, such as a unified inbox, and the second information is calendar information. Alternatively, an email may be displayed as the first information, and contact information, task information, or calendar information may be displayed as the second information. The second information may comprise further events or information. Other information may be displayed. In this example, FIG. 21 occurs after FIG. 13, where the first information 702 is displayed when the gesture is initially detected. The second information 1706 begins to be displayed as shown in FIG. 21 in an alternative format than the first information 702 as the gesture 1704 continues. In this example, the formatting comprises a dark gray background for the second information 1706 in FIG. 21. When the gesture 1704 continues, more of the second information 2206 is displayed as shown in FIG. 22, where the formatting of the second information 2206 includes a medium gray background that is lighter than the gray shown in FIG. 21. When the gesture 1704 continues further, more of the second information 2306 is displayed as shown in FIG. 23, where the formatting of the second information 2306 includes a light gray background that is much lighter than the dark gray shown in FIG. 21 and lighter than the medium gray shown in FIG. 22. In this example, the background color is gradually lightened as the gesture continues. The lighter the background color, the closer the gesture is to the second threshold. Thus, the formatting of the second information is gradually changed as the gesture continues. The gesture 1704 continues and meets the threshold, and the alternative formatting is discontinues, as shown in FIG. 24, where the first information 702 and the second information 2406 are displayed in the same format, e.g., unaltered. When the gesture 1704 is discontinued at the point shown in FIG. 24, the second information is expanded to fill the window or field. When the gesture 1704 discontinues at any point in length from FIG. 21 through FIG. 23 (before the gesture 1704 meets the second threshold), display of the second information discontinues, and the first information is displayed, such as shown in FIG. 13.

The alternative formatting of the second information may be gradually changed as the gesture continues, as more second information is displayed, as the second information is scrolled onto the display, and so forth. The formatting changes may be very gradual, such as a slight change every mm of movement of the gesture, or the formatting changes may be less gradual, such as a change in format each time a new item is displayed, such as a new calendar item, a new task, a new email, and so forth. When the alternative formatting of the second information gradually changes, the change may transition gradually to no alternative formatting when the gesture is at the second threshold. Alternatively, the alternative formatting may be distinctly visible immediately before the transition to no alternative formatting, resulting in a step change of formatting of the second information when the gesture meets the second threshold. Alternatively, the formatting may be simple, in that one unchanging format is applied to the second information prior to the second threshold and no alternative formatting is applied to the second information once the second threshold is met, e.g., the first information and the second information have the same formatting. In this alternative, the second information has two states, one alternative format and unformatted or normal formatting. When the alternative format is applied, a visual cue is provided to indicate, for example, that release of the gesture results in snapback or discontinuation of display of the second information. Optionally, the alternative formatting may comprise a transitional formatting that is applied to the second information at the transition between the application of the alternative formatting at the beginning of the gesture and the removal of the alternative formatting. The transitional alternative formatting may be an animation, change of color, or other formatting for a short distance, such as immediately before gesture meets the second threshold, e.g., 5 to 10 mm. The second information may have a single format or gradual formatting effect prior to the transitional alternative formatting. The examples in FIG. 21 through FIG. 23 show cross-hatching and background color as format examples. Other formatting may be utilized and gradually changed as the gesture continues, e.g., starting with a ghosted or somewhat transparent display of the second information and gradually rendering the second information in a more opaque or dense manner as the gesture continues.

As described above, optionally, the second information displayed prior to the gesture meeting the second threshold may not be selectable, e.g., where the second information is not interactive for input, and the second information displayed after the gesture meets the second threshold may be selectable, e.g., where the user may interact with second information to provide input based on the displayed information. With this option, the second information is not selectable when displayed in the alternative format, and is selectable when not displayed in the alternative format, e.g., when normally displayed or in a default format. As described above, the second application may not be launched upon detection of the gesture.

The amount or quantity of second information displayed increases or decreases, or varies, along with movement of the gesture in the examples of FIG. 17 through FIG. 24. The first information may scroll out of the window or field as the second information scrolls into the window or field, as shown in various figures. The first information and the second information may be combined chronologically in a scrollable list after the gesture meets the second threshold. The second information may be temporarily displayed, e.g., until the second information is scrolled off the display, after which the first information is displayed without displaying the second information until subsequent detection of the gesture. Alternative formatting as described in conjunction with the above examples may be utilized in conjunction with the resistive gesture, such as shown in the example of FIG. 13 through FIG. 16, or any other suitable gesture.

A method comprises displaying in a window or field first information associated with a first source running on a portable electronic device, detecting an input to display second information associated with a second source, and displaying second information associated with the second source and the first information in the window or field.

A method comprises prior to detecting an input, displaying information from a first source in a window or field of a portable electronic device, detecting the input on the portable electronic device, subsequent to detecting the input, displaying information from two or more sources including the first source in the window or field. The information from the two or more sources may include information pertaining to at least one future event. The information from the two or more sources may be combined and displayed in chronological order. The input may be a gesture requesting display of at least some information associated with a source of information other than the first source.

A method comprises detecting, by an electronic device, a first part of a gesture requesting display of second information. In response to detecting the first part of the gesture, a first part of the second information is displayed on a display of the electronic device while detecting a second part of the gesture. In response to detecting a third part of the gesture, a second part of the second information is gradually displayed along with movement of the second part of the gesture, wherein the second part of the second information follows the first part of the second information, and wherein the second part of the gesture follows the first part of the gesture.

A method comprises displaying first information for a first application in a window or field on an electronic device and detecting, by the electronic device, a gesture requesting display of second information for a second application. In response to detecting the gesture, during a first part of the gesture, the second information is displayed in a first format in a first part of the window or field while the first information is displayed in a second format in a second part of the window or field and during a second part of the gesture subsequent to the first part of the gesture, the second information is displayed in the second format.

A method comprises displaying first information in a second format in a window or field on an electronic device and detecting, by the electronic device, a gesture requesting display of second information for a second application. In response to detecting the gesture, prior to the gesture meeting a threshold, scrolling the second information in a first format into the window or field along with movement of the gesture and, when the gesture meets the threshold, displaying the second information in a second format in the window or field.

A method comprises displaying first information in a second format in a window or field on an electronic device and detecting, by the electronic device, a gesture requesting display of calendar information. In response to detecting the gesture: one or more calendar events are gradually displayed in a first format in the window or field while displaying at least some of the first information in a second format before the gesture meets a threshold, and the first format is gradually changed as the gesture continues; and one or more calendar events are displayed in the second format in the window or field after the gesture meets the threshold.

Although a touch-sensitive display is described in the above examples as the input device for gestures, other touch-sensitive input devices, such as optical joysticks, optical trackpads, trackballs, 3D input device, other navigation devices, and so forth, may be utilized.

The present method and electronic device make opening or display of information associated with a second application quicker, because the user need not navigate to a home page or open multiple applications to view information from multiple sources, such as multiple applications. Further, the user need not switch between multiple applications and/or windows to perform a task, such as replying to an email with scheduling information or phone numbers, because all the information may be displayed, for example, in response to a simple gesture. Information related to both past information, such as emails and missed phone calls, and future events, such as calendar items or tasks, may be viewed in a single field or window without having to switch between windows or applications. All displayed information may be displayed chronologically or by another order among the information from at least two applications. Information from multiple sources may be scrolled through in a single list. Because the first information and the second information may be integrated in a single list in one window or field, the first information and the second information are scrollable together, and with the ability to review both the first information and the second information with a single input, e.g., with a swipe to scroll, the user need not navigate elsewhere to open a separate application to obtain desired information. An optional resistive gesture reduces processing of inadvertent gestures by reducing display of second information, for example, until the gesture meets a threshold. Optional alternative formatting of the displayed second information indicates whether the gesture meets a threshold that determines, for example, whether the second information continues to be displayed after the gesture terminates or whether the second information is selectable. The various options described may be applied to display of information for two or more applications, which may be displayed in any orientation or arrangement with respect to each other.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
presenting a list of messages on a display of an electronic device, the messages managed by a messaging application executing on the electronic device;
detecting a gesture performed on the display;
in response to detecting the gesture, scrolling the list of messages and displaying at least one calendar event on the display and a reduced list of the messages, the at least one calendar event managed by a calendar application executing on the electronic device;
detecting continuation of the gesture after displaying the at least one calendar event and the reduced list of messages; and
when continuation of the gesture meets a threshold, displaying additional calendar events adjacent to the at least one calendar event on the display of the electronic device.

2. The method of claim 1, wherein the list of messages comprises a most-recent message presented adjacent to a first side of a banner indicating at least one of a date and time and the at least one calendar event is presented adjacent to a second side of the banner.

3. The method of claim 1, further comprising in response to detecting a second gesture, scrolling the list of messages and displaying at least one missed call on the display and a reduced list of the messages, the at least missed call managed by a caller application executing on the electronic device.

4. The method of claim 1, further comprising in response to detecting a second gesture, scrolling the list of messages and displaying at least one task and a reduced list of the messages, the at least one task managed by a task application executing on the electronic device.

5. An electronic device, comprising:
memory storing program instructions that when executed by a processor, cause the electronic device to:
present a list of messages on a display of the electronic device, the messages managed by a messaging application executing on the electronic device;
detect a gesture performed on the display;
in response to detecting the gesture, scroll the list of messages and display at least one calendar event on the display and a reduced list of the messages, the at least one calendar event managed by a calendar application executing on the electronic device;
detect continuation of the gesture after displaying the at least one calendar event and the reduced list of messages; and
when continuation of the gesture meets a threshold, display additional calendar events adjacent to the at least one calendar event on the display of the electronic device.

6. A non-transitory memory medium storing program instructions, that when executed by a processor, cause an electronic device to:
present a list of messages on a display of the electronic device, the messages managed by a messaging application executing on the electronic device;
detect a gesture performed on the display;
in response to detecting the gesture, scroll the list of messages and display at least one calendar event on the display and a reduced list of the messages, the at least one calendar event managed by a calendar application executing on the electronic device;
detect continuation of the gesture after displaying the at least one calendar event and the reduced list of messages; and
when continuation of the gesture meets a threshold, display additional calendar events adjacent to the at least one calendar event on the display of the electronic device.

* * * * *